US012705577B2

(12) United States Patent
Shaikh et al.

(10) Patent No.: US 12,705,577 B2
(45) Date of Patent: Aug. 11, 2026

(54) COLLABORATIVE VOICE-BASED DESIGN AND DEVELOPMENT SYSTEM

(71) Applicant: The Travelers Indemnity Company, Hartford, CT (US)

(72) Inventors: Obaid Shaikh, Weatogue, CT (US); Chandra S. Bathula, Rocky Hill, CT (US); Rebecca T. Scanlon, Manchester, CT (US); Annapurna Jagasia, Windsor, CT (US); Bharghavi Tanamala, East Windsor, CT (US); Robert O'Connor, Harwinton, CT (US); Matthew W. Kropp, Manchester, CT (US); Jhin McGlynn, Waterford, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 668 days.

(21) Appl. No.: 17/877,111

(22) Filed: Jul. 29, 2022

(65) Prior Publication Data

US 2024/0038227 A1 Feb. 1, 2024

(51) Int. Cl.

| | |
|---|---|
| ***G10L 15/22*** | (2006.01) |
| ***G06Q 10/101*** | (2023.01) |
| ***G06T 11/00*** | (2026.01) |
| ***G10L 15/26*** | (2006.01) |

(52) U.S. Cl.

CPC ............ *G10L 15/22* (2013.01); *G06Q 10/101* (2013.01); *G06T 11/80* (2013.01); *G10L 15/26* (2013.01); *G10L 2015/223* (2013.01)

(58) Field of Classification Search

CPC ... G10L 15/22; G10L 15/26; G10L 2015/223; G06Q 10/101; G06T 11/80

See application file for complete search history.

(56) References Cited

U.S. PATENT DOCUMENTS

| | | | | |
|---|---|---|---|---|
| 6,640,144 | B1 * | 10/2003 | Huang | G08C 19/28 345/169 |
| 9,430,035 | B2 * | 8/2016 | Anderson | G06F 3/04883 |
| 2015/0040012 | A1 * | 2/2015 | Faaborg | G10L 15/1815 715/728 |

(Continued)

*Primary Examiner* — Bhavesh M Mehta
*Assistant Examiner* — Edward Tracy, Jr.
(74) *Attorney, Agent, or Firm* — CANTOR COLBURN LLP

(57) ABSTRACT

A system includes a multi-user interface and a collaborative drawing tool. The collaborative drawing tool can receive a first set of voice-based drawing commands from a first user, perform a first speech-to-text conversion to transform the first set of voice-based drawing commands into a first set of drawing commands, and render a first drawing update on the multi-user interface based on the first set of drawing commands. The collaborative drawing tool can receive a second set of voice-based drawing commands from a second user, perform a second speech-to-text conversion to transform the second set of voice-based drawing commands into a second set of drawing commands, render a second drawing update on the multi-user interface based on the second set of drawing commands, and save, to a storage system, a drawing output of the multi-user interface resulting from the first drawing update and the second drawing update.

25 Claims, 11 Drawing Sheets

(56) References Cited

U.S. PATENT DOCUMENTS

2015/0081629 A1* 3/2015 Newman ............. H04L 67/1095
707/613
2015/0195320 A1* 7/2015 Avraham ................. G09B 5/14
709/219
2015/0358584 A1* 12/2015 Mattson ............... G06Q 10/101
348/14.08
2016/0125879 A1* 5/2016 Lovitt ..................... G10L 17/00
704/275
2016/0125881 A1* 5/2016 Vogel ...................... G06F 40/30
704/9
2017/0140755 A1* 5/2017 Andreas .................. G06F 40/35
2017/0329573 A1* 11/2017 Mixter ............... H04N 21/4104
2018/0144744 A1* 5/2018 Badarinath ............. G10L 15/22
2022/0121498 A1* 4/2022 Weber ................... G06F 9/3836

* cited by examiner

COLLABORATIVE VOICE-BASED DESIGN AND DEVELOPMENT SYSTEM

BACKGROUND

In collaboratively designing and developing complex systems, a large amount of coordination is needed between multiple entities. To facilitate coordination of development, interactive communication sessions are typically needed to create and/or review designs. Efforts can be coordinated through multiple communication channels and development tools. In some instances, a single user of a group of users in a collaborative session will act as the scribe to enter data and manually draw or annotate a drawing based on listening to the conversation of the group. This approach can be cumbersome as the resulting notes and drawings are often in a rough form and not directly usable to implement formal designs. Users then must revisit the notes and sketches and manually determine how to interpret the material and generate or update files in other design tools.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

Figure 1:
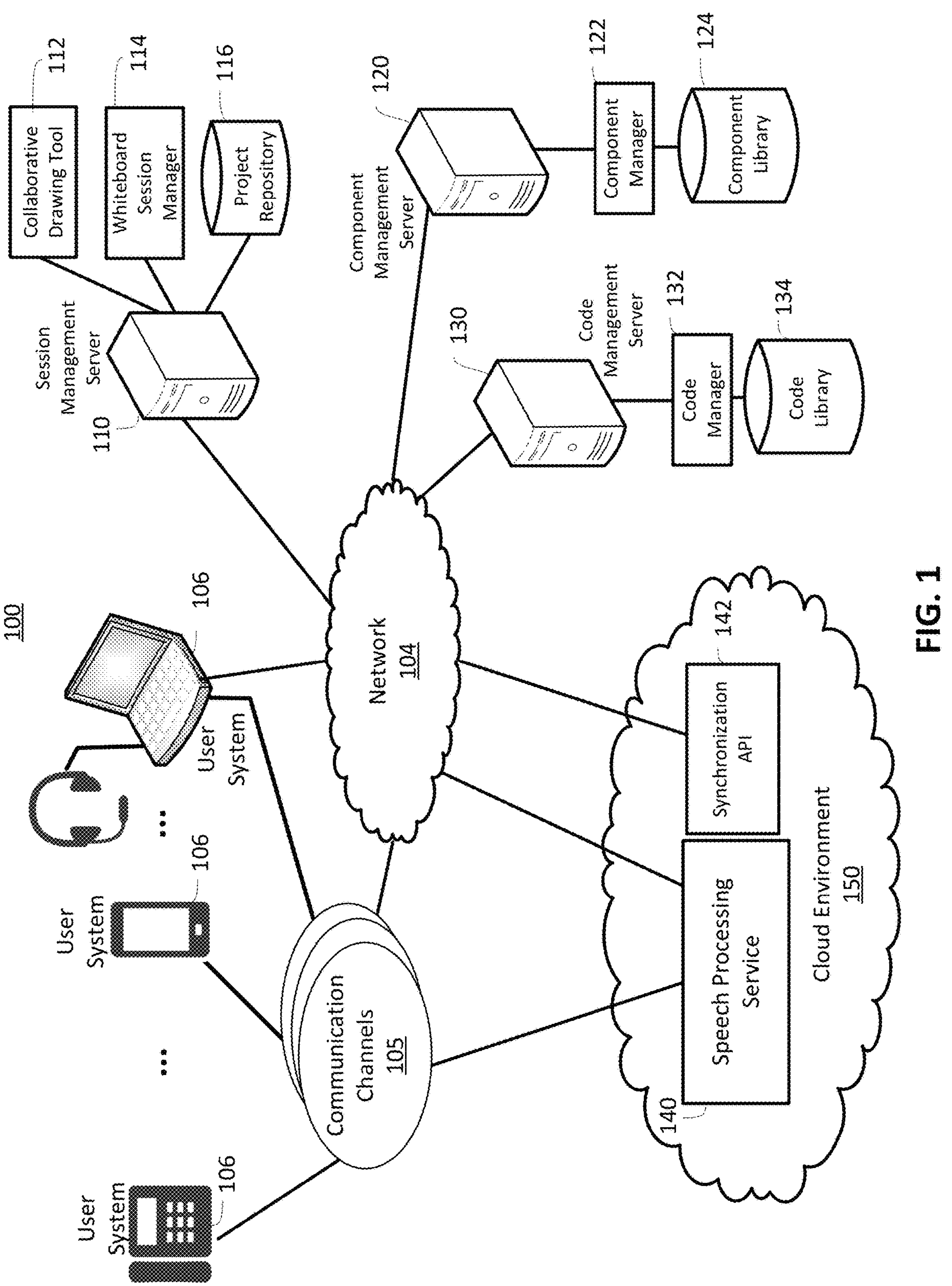
FIG. 1 depicts a block diagram of a system according to some embodiments of the present invention.

According to an embodiment, a collaborative voice-based design and development system is provided. The system can provide voice-enabled interaction and command interpretation to create and modify drawings in a shared communication session. The system can listen for voice-based commands issued by participants during a meeting through communication channels. The system can access various data sources and subsystems to interpret speech in a natural language format and generate a graph of connected nodes representing a process, a flow chart, a system architecture, and/or other types of drawings. The system can interpret commands in real-time during a meeting and synchronize drawing updates to illustrate the resulting drawing on user systems connected to the shared communication session. Thus, multiple users can actively update the drawings using voice-based commands during the shared communication session, and the updates can be synchronized on the visual display presented to all of the users of the shared communication session.

The system can limit the permissions of actions initiated by some user systems. For example, the system can identify a user initiating a command and verify whether the identified user has permission to execute the requested command. This can allow for users to join a meeting and participate in a design discussion, while only allowing a subset of users to make updates to a shared drawing through voice-based commands. Further, users with permissions for one project may not be able to access data or initiate actions for projects where the users do not have such permissions. Thus, the system can automate drawing creation and updates through voice-based interactions to enhance user interface experience, while also maintaining the underlying security rules of the development environment. The system, as further described herein, can enable more effective management of computing resources and data sources in a development environment and thus provides technical benefits. Further, the system can automatically place and link drawing components, while automatically rescaling the drawing to reduce user interface burdens and rapidly develop/modify drawings through voice commands in a shared environment.

Turning now to FIG. 1, a system 100 is depicted upon which collaborative voice-based design and development of drawings through a shared communication session may be implemented. The system 100 can include a session management server 110, a component management server 120, a code management server 130, and other subsystems or servers (not depicted). The session management server 110 can execute one or more applications that are used to establish shared communication sessions and view/edit drawings. In the example of FIG. 1, the session management server 110 can execute a collaborative drawing tool 112 and a whiteboard session manager 114. The collaborative drawing tool 112 and/or whiteboard session manager 114 can comprise distributed applications where a portion of the applications may be executed locally on two or more user systems 106. The portion of the applications executed locally on two or more user systems 106 can comprise stand-alone applications or plugins/extensions to other applications, such as electronic meeting applications. Further, the collaborative drawing tool 112 and/or whiteboard session manager 114 can be web-enabled such that a web browser of the user systems 106 can be used to interact with the collaborative drawing tool 112 and/or whiteboard session manager 114.

The session management server 110 may also host or have access to a project repository 116. The project repository 116 can hold drawing definition files, object files, graphical representations of drawings (e.g., image files or portable document format files), and other such supporting data that captures drawings generated or edited through the collaborative drawing tool 112. The project repository 116 can also track user permissions, change history, and limit access to content based on user/group permission settings. For example, tracking change history of the project files in the project repository can support auditing and reversion to a previous version Of a drawing, if desired. Further, the project repository 116 can store drawing templates to provide a starting point for creating/editing new drawings that align with predetermined design patterns. Project files can define links between multiple components and code used to graphically depict the components and links along with customization parameters.

The component management server 120 can include a component manager 122 and a component library 124. The component manager 122 can receive search and retrieval requests to access component data in the component library 124. The component manager 122 can also support the addition of new components to the component library 124, as well as updates to the components. Permissions to edit or delete components of the component library 124 may differ from permissions to access components of the component library 124 in developing drawing projects through the collaborative drawing tool 112. Components can be grouped in palettes with templates to support specific drawing types. For example, a dataflow palette may include component definitions that access a file or object, filter data, merge data, and store data in a file or database. A flowchart palette may include start/end components, process components, decision block components, data/document access components, and other such components. A mapping palette can include components to support a physical layout of a space, such as a seating chart, office layout, building features, landscaping features, parking features, and other such components. When used for technology development, components of the component library may define architectural aspects for linking multiple computer systems together to access and process data from multiple sources. Components may be defined in terms of component type, input links, output links, class, name, and other such data and rules. Multiple components of the component library 124 can be linked together to form projects in the project repository 116. Further, components can be nested, where groups of linked components are combined to form a hierarchical component. This can allow for more complex designs with multiple layers of components.

The code management server 130 can include a code manager 132 and a code library 134. The code manager 132 can receive retrieval requests to access code from the code library 134 to generate graphical depictions of components from the component library 124. The code manager 132 can also support the addition of code for new components to the component library 124, as well as updates to the code in the code library 134. The code library 134 can also include platform specific features such that depictions of components can be tuned for specific platform constraints. For instance, differences in operating systems of the user systems 106 or web browsers can be accommodated through different code selection to depict a selected component. As an example, the collaborative drawing tool 112 may be accessed through a mobile device and a laptop computer as part of a shared whiteboard session through two user systems 106. Where a same component is selected for graphical depiction, a mobile device compatible version of code to display the component may be sent from the code library 134 to the mobile device, and a general display version of code to display the component may be sent from the code library 134 to the laptop computer. The component definition and links defined through the component library 124 can remain the same for the project regardless of device type, but the code used to render a graphical depiction of the component can vary for different device types, if needed.

Although the session management server 110, component management server 120, and code management server 130 are depicted as separate servers, the servers 110, 120, 130 can be combined or further subdivided. For example, there can be multiple component management servers 120 and code management servers 130, or the component management server 120 and code management server 130 can be combined. In the example of FIG. 1, the session management server 110, component management server 120, and code management server 130 can interface with each other and/or with user systems 106 through a network 104.

The whiteboard session manager 114 can interface with a voice-enabled communication session through one of the communication channels 105 that receive voice input from user systems 106. The whiteboard session manager 114 can direct voice-based input from the communication channels 105 to a speech processing service 140. The speech processing service 140 can be implemented, for example, in a cloud environment 150 as a service to assist in converting voice input into text for further processing. The collaborative drawing tool 112 can determine how to interpret the text into drawing commands that add/modify a component from the component library 124 to a drawing project and select associated code from the code library 134 to render the drawing on a display of each of the user systems 106 participating in the shared whiteboard session. A synchronization application programming interface (API) 142 can be used to push drawing updates to each of the user systems 106 participating in the shared whiteboard session. The synchronization API 142 can comprise part of the cloud environment 150 or may be implemented elsewhere within the system 100. As one example, if a user issues a voice-based command to add a new component linked to an existing component of a drawing as part of a shared whiteboard session managed by the whiteboard session manager 114, the voice-based command is converted into text by the speech processing service 140 and provided to the collaborative drawing tool 112 for processing. The collaborative drawing tool 112 can interpret the text as one or more commands and form a message to incorporate the new components from the component library 124 into the drawing. The message can be in a JavaScript Object Notation (JSON) format or other such machine-interpretable format. The message can be parsed by the whiteboard session manager 114 and code to update the drawing based on the new component can be retrieved from the code library 134. The code can be in any programming or scripting language, such as JavaScript. The updated drawing can be sent to the synchronization API 142, which distributes the updated drawing to the user systems 106. There may be multiple versions of the drawing distributed where customizations are needed for specific user systems 106. The project repository 116 captures the changes to the drawing such that the whiteboard session can be stopped, and the drawing can be accessed again at a later time.

In the example of FIG. 1, each of the user systems 106, session management server 110, component management server 120, code management server 130, and cloud environment 150 can include at least one processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the user systems 106, session management server 110, component management server 120, code management server 130, and/or cloud environment 150. The cloud environment 150 can include computing resources distributed over multiple networked computer systems. Although depicted separately, the session management server 110, component management server 120, and/or code management server 130 can be incorporated within the cloud environment 150.

The user systems 106 may be implemented using a computer executing one or more computer programs for carrying out processes described herein. In one embodiment, the user systems 106 may each comprise a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 106 can be operated by users of a development environment, managers, and/or administrators.

Each of the user systems 106, session management server 110, component management server 120, code management server 130, and cloud environment 150 can include a local data storage device, such as a memory device. A memory device, also referred to herein as "computer-readable memory" (e.g., non-transitory memory devices, as opposed to transmission devices or media), may generally store program instructions, code, and/or modules that, when executed by a processing device, cause a particular machine to function in accordance with one or more embodiments described herein.

The network 104 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 104 may be implemented using a wired network, an optical network, a wireless network, and/or any kind of physical network implementation known in the art.

Figure 2:
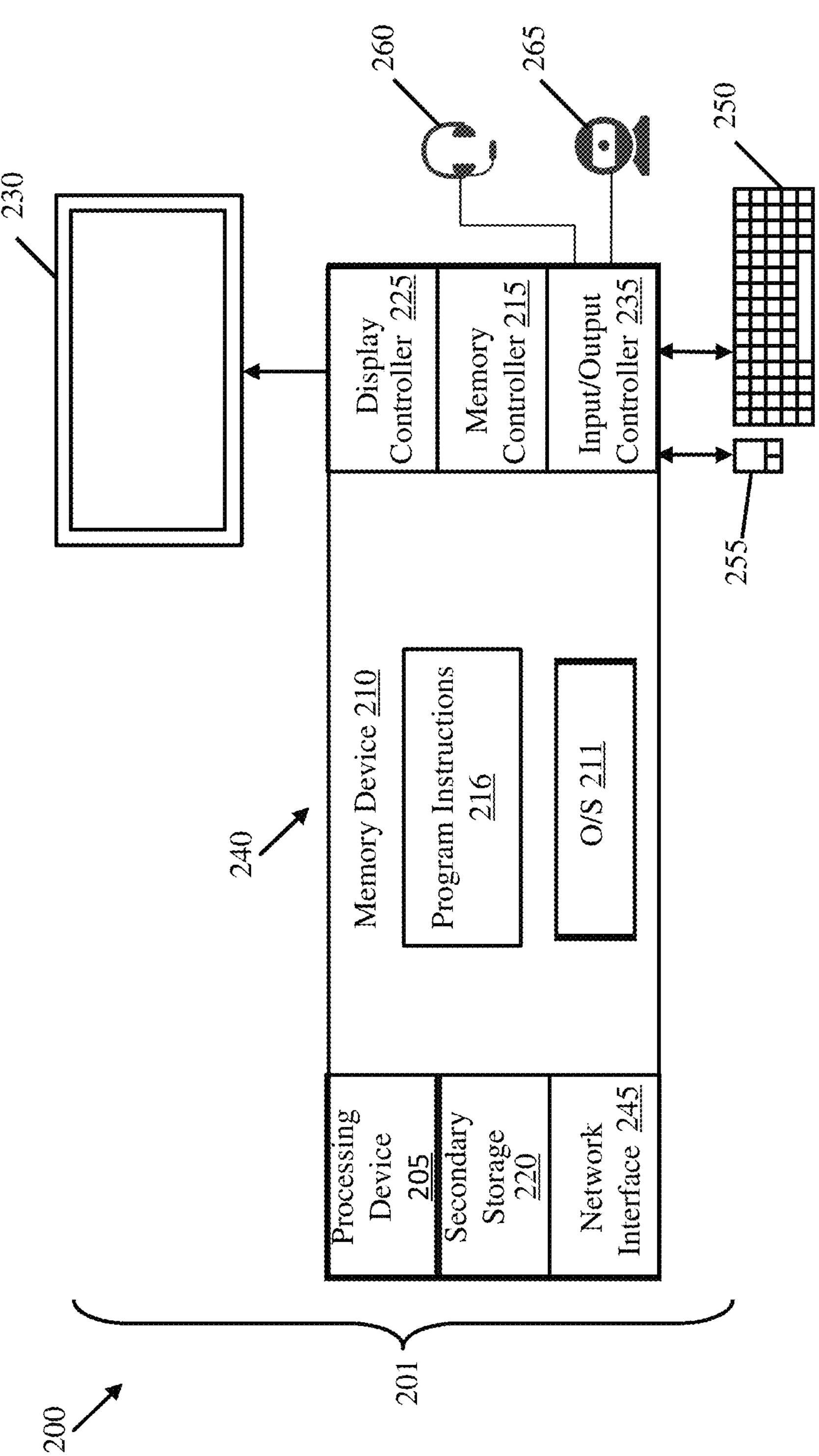
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the user systems 106, session management server 110, component management server 120, and/or code management server 130 of FIG. 1. Multiple instances of the system 200 can be interconnected and managed by a third-party to form the cloud environment 150.

In an exemplary embodiment, in terms of hardware architecture, as shown in FIG. 2, the computer 201 includes a processing device 205 and a memory device 210 coupled to a memory controller 215 and an input/output controller 235. The processing device 205 can also be referred to as a processing system 205 and may include multiple processors (e.g., one or more multi-core processors). The input/output controller 235 can also interface with audio devices 260, such as speakers, a microphone, a headset, etc. The input/output controller 235 can also receive video or image input through a camera 265, for example, to support video teleconferencing. The memory device 210 can also be referred to as a memory system 210 and may include multiple types of memory in various configurations, such as a combination of memory cards and memory chips with volatile and/or non-volatile storage capacity. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom-made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the collaborative drawing tool 112, the whiteboard session manager 114, the component manager 122, the code manager 132, the speech processing service 140, and/or the synchronization API 142 of FIG. 1.

The computer 201 of FIG. 2 also includes a network interface 245 that can establish communication channels with one or more other computer systems via one or more network links of the network 104 of FIG. 1. The network interface 245 can support wired and/or wireless communication protocols known in the art. For example, when embodied in the session management server 110 of FIG. 1, the network interface 245 can establish communication with at least one of the communication channels 105, the component management server 120, the code management server 130, and/or the cloud environment 150 of FIG. 1 via the network 104 of FIG. 1.

Figure 3:
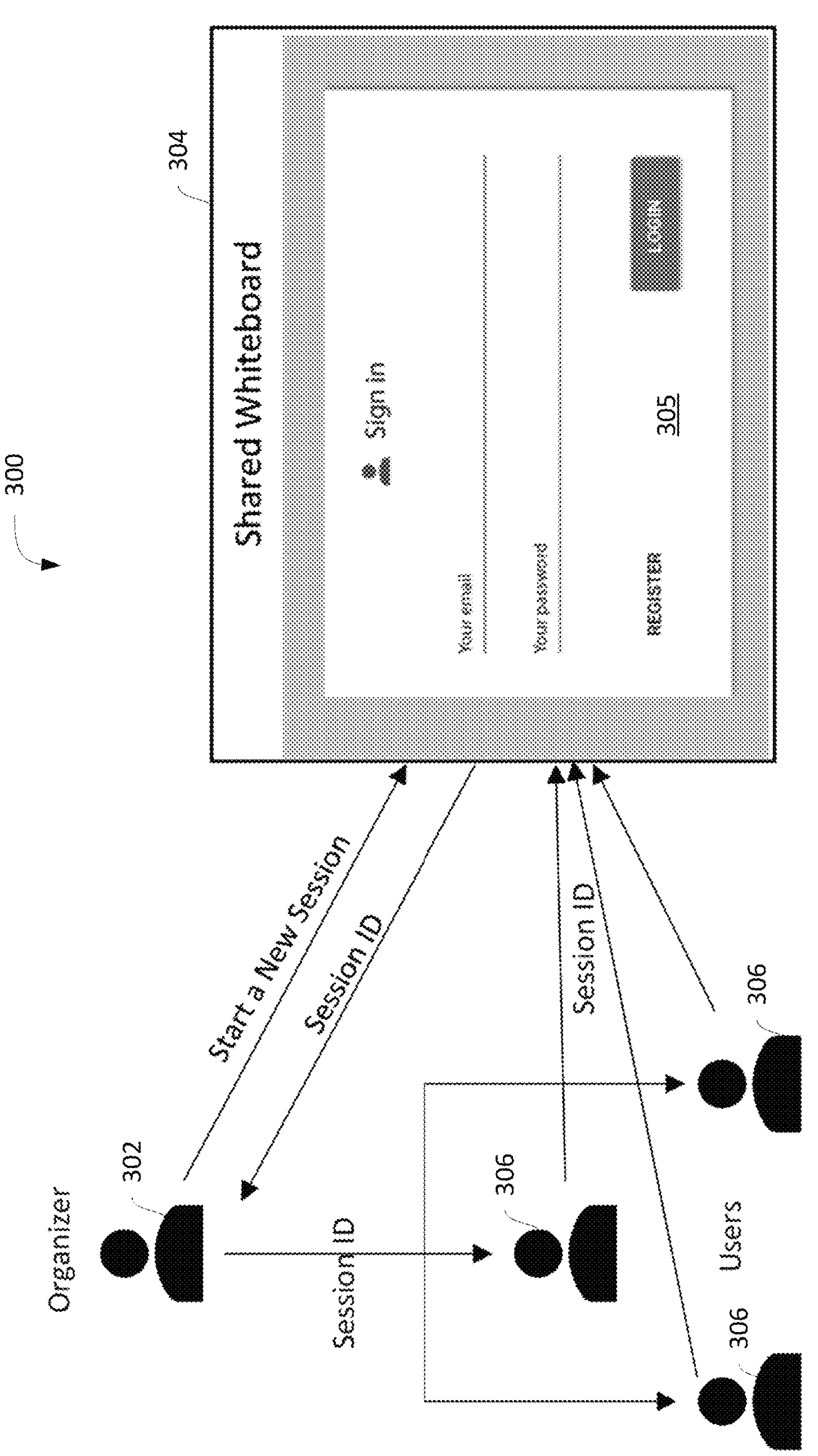
FIG. 3 depicts a block diagram of a shared whiteboard session initiation process according to some embodiments of the present invention.

FIG. 3 depicts an example of a block diagram of a shared whiteboard session initiation process 300 according to an embodiment and is described in reference to FIGS. 1-3. As depicted in the example of FIG. 3, the shared whiteboard session initiation process 300 can include an organizer 302 starting a new session of a shared whiteboard 304, for instance, through a user system 106 interfacing with the whiteboard session manager 114 of FIG. 1. The organizer 302 may be prompted to enter credentials through a sign-in interface 305 of the shared whiteboard 304. Upon the whiteboard session manager 114 confirming credentials of the organizer 302 through the sign-in interface 305, the whiteboard session manager 114 can issue a session identifier to the organizer 302 to initiate a new session of the shared whiteboard 304 with multiple users 306. The users 306 can each access the shared whiteboard 304 and enter credentials through the sign-in interface 305. The user systems 106 of FIG. 1 can also pass the shared identifier to the whiteboard session manager 114 to confirm that the users 306 should be joined through communication channels 105 of FIG. 1 to the new session of a shared whiteboard 304. The communication channels 105 can allow the users 306 to speak with each other through microphones and speakers of the user devices 106. The whiteboard session manager 114 can also allow the organizer 302 and users 306 to collaboratively create and modify a shared drawing using voice-based commands through the collaborative drawing tool 112.

Figure 4:
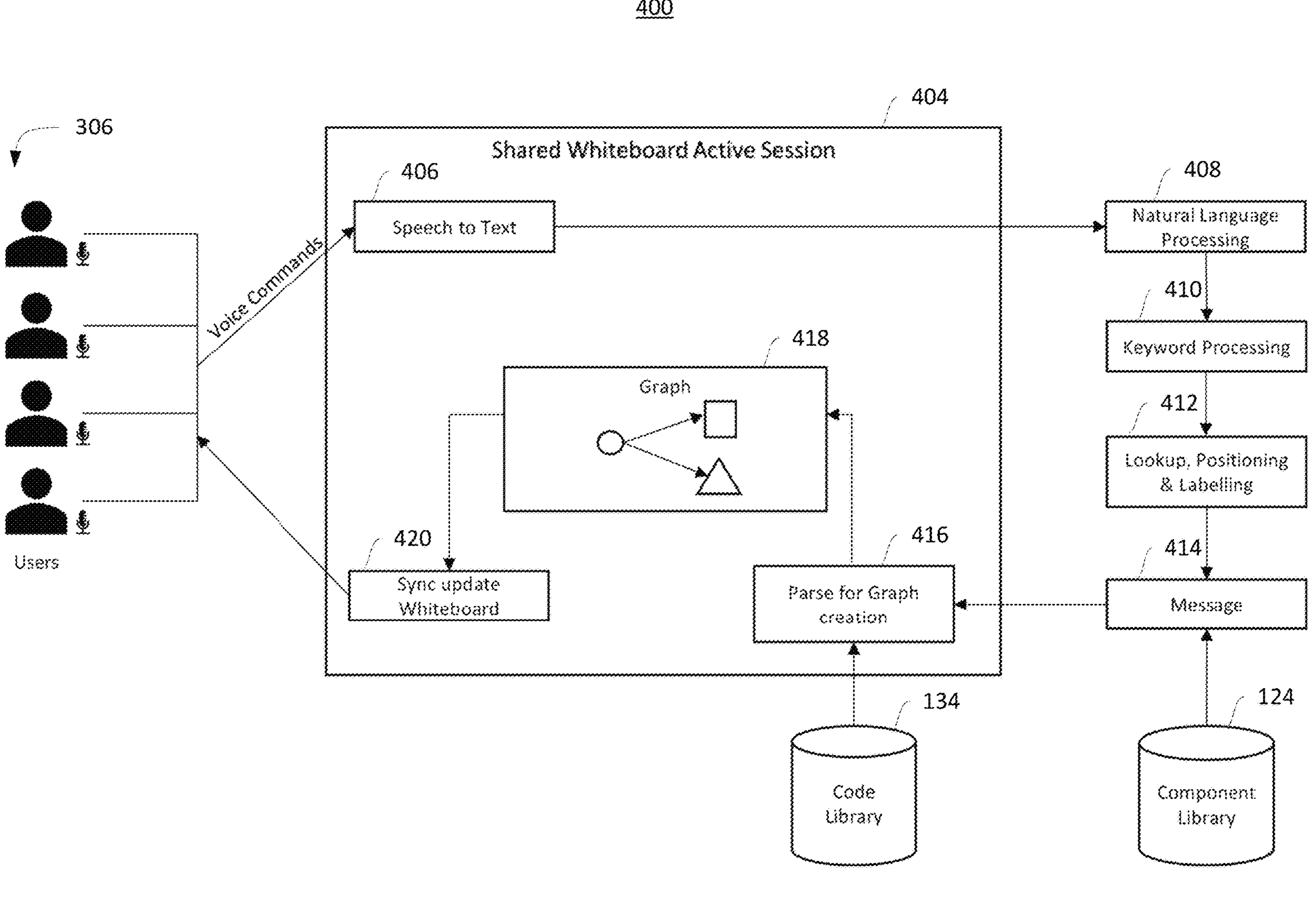
FIG. 4 depicts a block diagram of a shared whiteboard session management process according to some embodiments of the present invention.

FIG. 4 depicts a block diagram of a shared whiteboard session management process 400 according to an embodiment and is described in reference to FIGS. 1-4. As depicted in the example of FIG. 4, the shared whiteboard session management process 400 includes a shared whiteboard active session 404 that can be active after the shared whiteboard session initiation process 300 of FIG. 3 activates a whiteboard session associated with the session identifier for users 306, which may also include the organizer 302 of FIG. 3. One or more of the users 306 can, in turn, issue voice commands to speech-to-text processing 406 of the shared whiteboard active session 404. The speech-to-text processing 406 can be performed by the speech processing service 140 of FIG. 1 to perform an initial conversion of voice data into text. The resulting text can be further processed to interpret the text into phrases using a standardized format through natural language processing 408. The shared whiteboard active session 404 can be managed by the whiteboard session manager 114 of FIG. 1. The natural language processing 408 can be performed by the speech processing service 140 or another service of the system 100 of FIG. 1. The natural language processing 408 may attempt to determine which words or phrases captured in the text are intended to be commands. For example, a key phrase, such as "Hey Visualate", may be used to indicate that a drawing command is following. The natural language processing 408 can perform a normalization to convert various synonyms into a standardized format. For example, "insert a filter component connected to the join component" may be stated in many different ways, such as "link a filter to the join", "add a filter block and connect it to the join block", "put a filter on the drawing and connect the join to it", "link a filter to the input of the join", "insert a filter between the file block output and the join input", "connect a filter to the join input", etc. As there can be many different ways to express a common intent, the natural language processing 408 can use a machine learning process to accept many possible variations and output a common expression for further analysis by keyword processing 410.

Keyword processing 410 can parse the output of the natural language processing 408 to distinguish commands from parameters and words or phrases which cannot be understood. Further processing is performed at block 412 to lookup components and commands to be used in creating or modifying a drawing based on the identified keywords. Block 412 can also perform positioning and labeling of components for how the components should be rendered on screen. A message 414 can be created based on the component lookup from the component library 124 and the positioning and labeling of block 412. As an example, the keyword processing 410, block 412, and creation of message 414 can be performed by the collaborative drawing tool 112. Further, the collaborative drawing tool 112 may also perform a portion of the natural language processing 408. The collaborative drawing tool 112 can track where components already exist in the drawing and determine where to insert new components. Positioning may include shifting existing components and rescaling and/or shifting the drawing to maintain readability. The message can include high-level information indicating a framework for the drawing with the detailed instructions about rendering the individual shapes and links being captured within the associated code of the code library 134. The message 414 can be sent to the shared whiteboard active session 404, where the whiteboard session manager 114 can parse for graph creation 416 to create or update a graph 418 representing the drawing based on the message 414 and code retrieved from the code library 134. Once the graph 418 is created or updated, the whiteboard session manager 114 can trigger a synchronization update 420 for the shared whiteboard active session 404 to send the graph 418 as updated to the user systems 106 of the users 306. The synchronization update 420 can be performed by sending the graph 418 in a compatible format to the synchronization API 142 of FIG. 1, which flows the graph 418 to user interfaces of the user systems 106.

Figure 5:
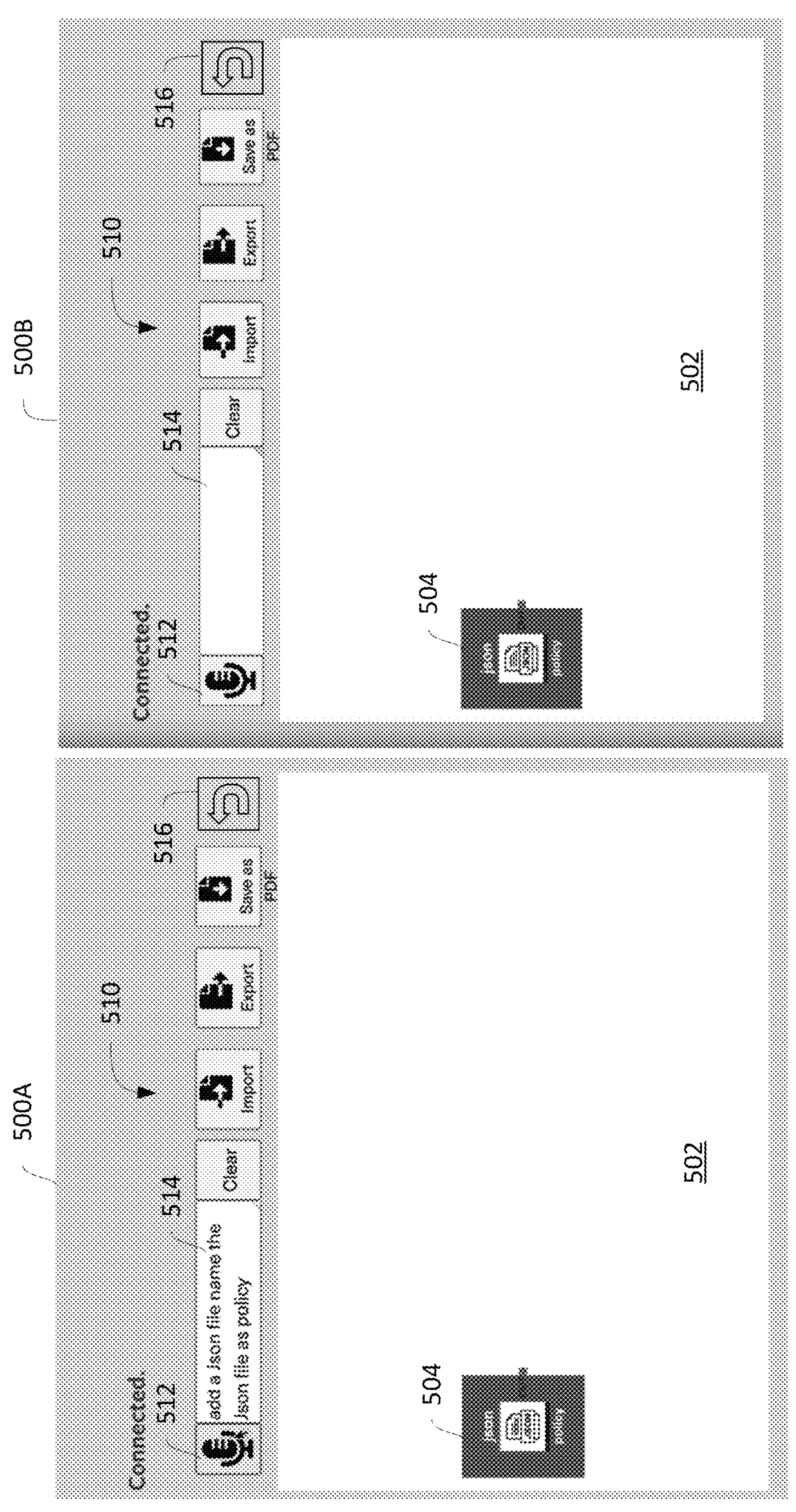
FIG. 5 depicts a block diagram of two instances of a multi-user interface during an active shared whiteboard session according to some embodiments of the present invention.
Figure 6:
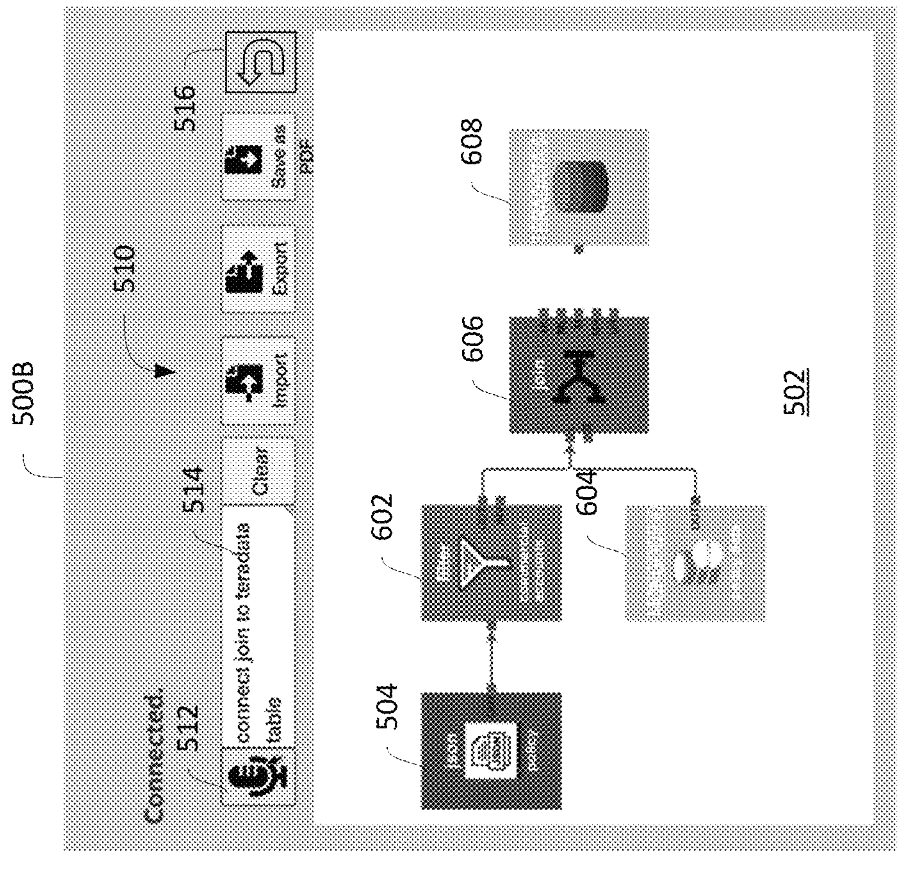
FIG. 6 depicts a block diagram of two instances of a multi-user interface during an active shared whiteboard session according to some embodiments of the present invention.
Figure 6:
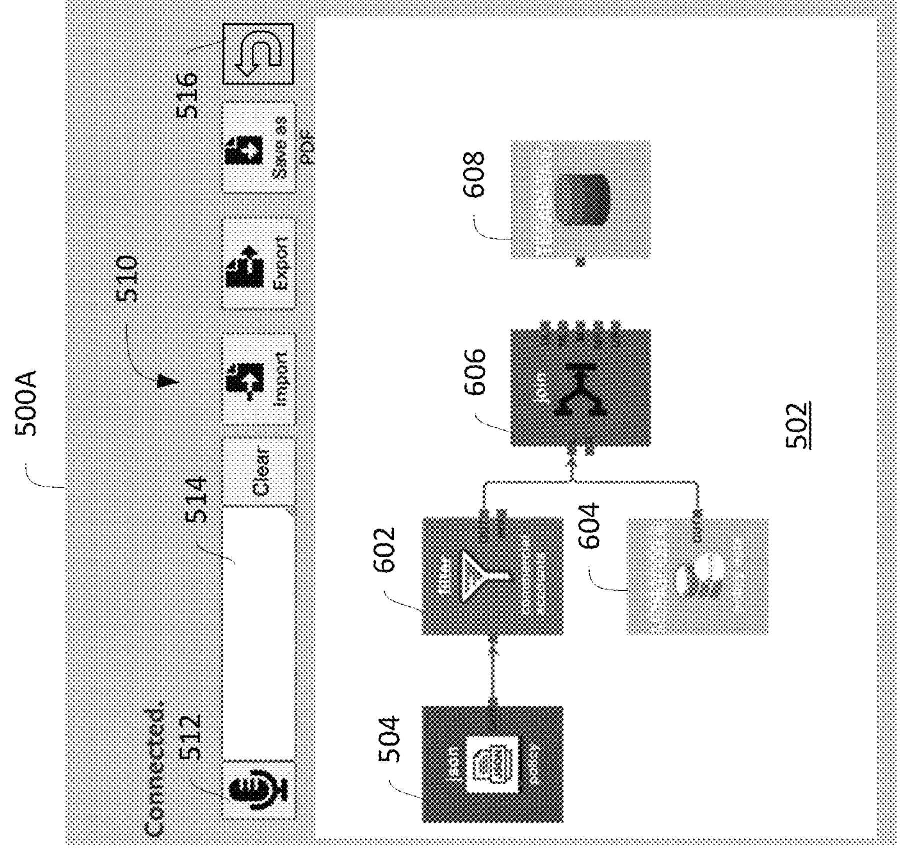
Figure 7:
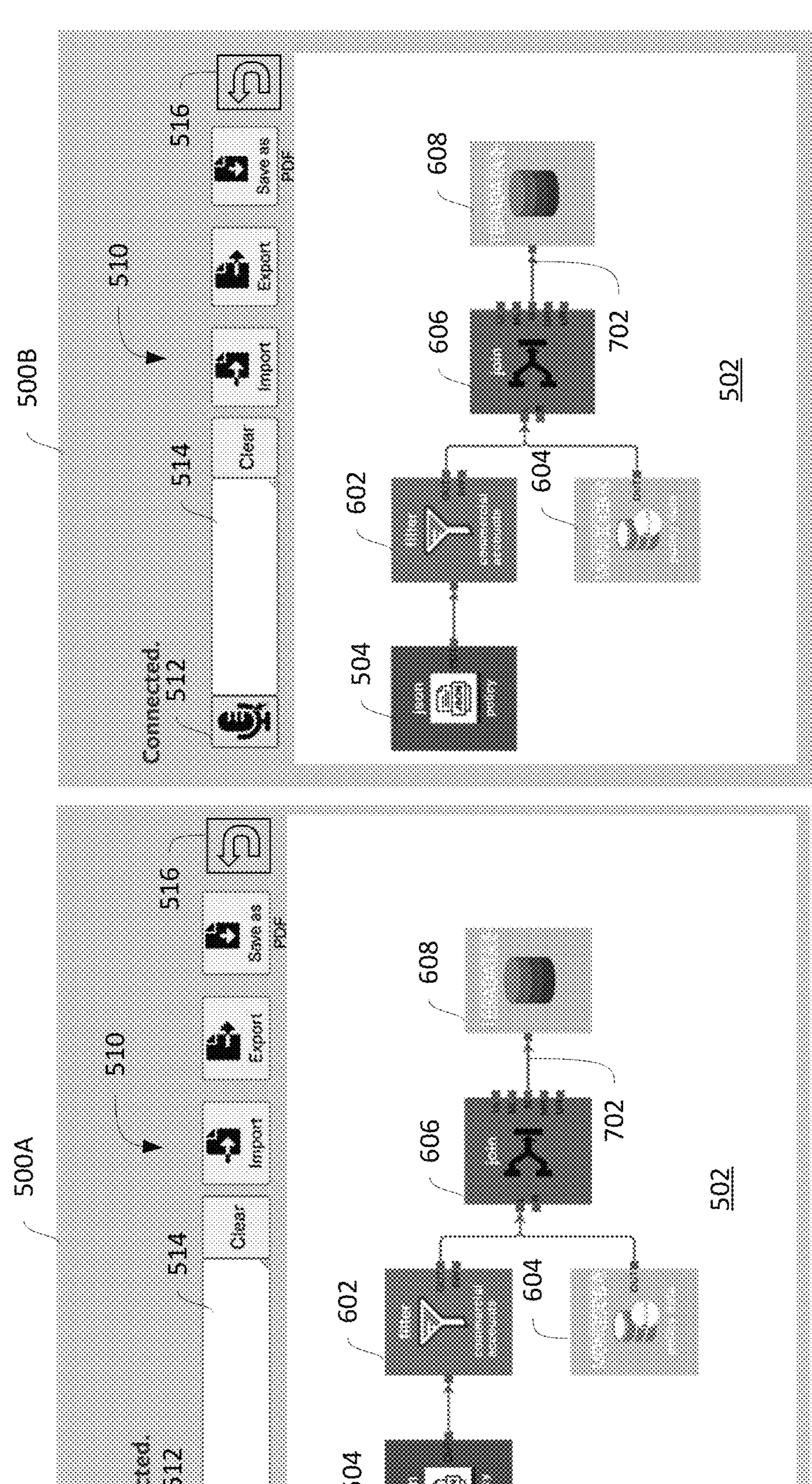
FIG. 7 depicts a block diagram of two instances of a multi-user interface during an active shared whiteboard session according to some embodiments of the present invention.

An example use case is illustrated and further explained in reference to FIGS. 5-7 with continued reference to FIGS. 1-4. FIGS. 5, 6, and 7 depict block diagrams of instances of a multi-user interface during an active shared whiteboard session as the graph building process progresses during a shared whiteboard session. The users 306 of FIG. 4 can include, for instance, an analyst, a technical lead, a developer, and a system architect. Each of the users 306 can interact with the shared whiteboard active session 404 using a multi-user interface 500A, 500B configured to be shared by a plurality of user connections over a network interface. For instance, multi-user interface 500A can be displayed on the user system 106 of the analyst and multi-user interface 500B can be displayed on one or more user systems 106 of the other users 306. The multi-user interfaces 500A, 500B both depict a whiteboard space 502, where components can be graphically depicted and linked to form drawings, such as graph 418. The multi-user interfaces 500A, 500B also include a command interface 510. In embodiments, the command interface 510 can be relatively simple, since commands are voice-based and thus minimize the need for manually selectable drawing tools. For example, the command interface 510 can include a voice input selector 512, a command visualizer 514, and various import, export, and save options. Further, the command interface 510 can include an undo/redo selector 516 and may provide status information regarding the current session, e.g., connectivity status.

The voice input selector 512 can indicate whether the microphone of the user system 106 is selected from the group of microphones for all users 306 to provide voice-based commands. For example, the voice input selector 512 can be selectable through the multi-user interfaces 500A, 500B to show whether a user 306 is requesting to input a voice-based command. When selected for active use, one or more aspects of the voice input selector 512 may change, such as a color change, a highlight, an icon size, or other such indication. When a user 306 is done speaking voice commands, the voice input selector 512 can be deselected. Further, other users may have an aspect of the voice input selector 512 change locally if a user has requested to enter voice-based commands. For instance, the voice input selector 512 that is active may change to a more prominent color, e.g., red, while the voice input selector 512 for other multi-user interfaces 500A, 500B may be made less prominent, e.g., grayed out. If no user has requested to control the voice input selector 512, then the voice input selector 512 for all of the multi-user interfaces 500A, 500B may be in a neutral state, e.g., a black foreground with a gray background. Once a user 306 has selected to make voice-based command inputs through the voice input selector 512, audio filtering may be used to ensure that voice-based commands associated with the multi-user interface 500A, 500B of the selected instance of the voice input selector 512 are directly picked up through the microphone, and background sounds are not picked up from other users 306 through the local speakers proximate to the microphone.

In some embodiments, the command visualizer 514 may be active to illustrate how voice commands detected through the microphone of a multi-user interface 500 are being interpreted and converted into text. However, the command visualizer 514 need not be active or visible. Further, in some embodiments, text captured in the command visualizer 514 may be directly editable to adjust the wording if an error condition occurs in the voice capture or conversion to text. Where the command visualizer 514 is used, the command interface 510 may also include a clear function to rapidly delete any text captured. The sequence of commands captured by the command visualizer 514 may also be recorded in a log file to support subsequent investigation or auditing of how a graph 418 was created and/or modified.

The example of FIG. 5 illustrates that a user 306 of multi-user interface 500A selected the voice input selector 512 and stated a command sequence interpreted as "add a JSON file name the JSON file as policy" as depicted in the command visualizer 514 of multi-user interface 500A. Notably, the equivalent text does not appear in the command visualizer 514 of multi-user interface 500B, since the voice-based command originated at the multi-user interface 500A. Upon processing the voice-based command through the multi-user interface 500A, a JSON file component 504 with a file name of "policy" is synchronized as output to both of the multi-user interfaces 500A, 500B. The initial placement of the first component of a graph may default to a left of center position to provide building space for linking further components.

If the voice-based command was, for instance, "Add a JSON file and name the JSON file as 'policy'", the natural language processing 408 may reformat the voice-based command to use standardized formatting for keyword detection by the keyword processing 410 to identify a command as "JSON file" and "name policy" to label the JSON file as "Policy". An example of a message 414 resulting from the processing can be as follows:

```
{ "class": "go.GraphLinksModel",
  "nodeCategoryProperty": "type",
  "linkFromPortIdProperty": "frompid",
  "linkToPortIdProperty": "topid",
  "nodeDataArray": [
{"key":1, "type":"JSON", "name":"Policy"}
  ]
  }
```

FIG. 6 depicts further progress made in collaboratively developing a graph using voice-based commands. In the example of FIG. 6, a filter component 602 has been added and linked to the output of the JSON file component 504. A database (e.g., MONGODB®) component 604 has also been added, where an output of the filter component 602 and an output of the database component 604 are combined at an input of a join component 606. An additional database (e.g., TERADATA®) component 608 has also been added but is not yet linked. In the example of FIG. 6, a user 306 of multi-user interface 500B has issued a voice-based command of "connect join to Teradata table". In the example of FIG. 6, the command has not yet been processed, and thus no update is yet visible through multi-user interface 500A or multi-user interface 500B. As an example, commands can be formatted as "Add a Filter after the JSON File" and/or "Join the filtered commercial accounts and policy data". Once components are added, the components can be identified and tracked by element type or labels. As more components are added, the whiteboard space 502 can be automatically resized, reshaped, and/or icons moved to create a clean seamless flow.

FIG. 7 depicts the multi-user interfaces 500A, 500B after the state of FIG. 6, where link 702 has been added to synchronize the graphs depicted in the multi-user interfaces 500A, 500B upon processing the voice-based command of FIG. 6. Once the final design is complete, the output can be exported and/or saved in a shareable format, such as a portable document file format. The resulting graph can be stored in the project repository 116 in one or more formats. As an example, the graph can be output as a JSON file that can later be imported and further updated as needed. An example of a JSON output is as follows:

```
{ "class": "go.GraphLinksModel",
  "nodeCategoryProperty": "type",
  "linkFromPortIdProperty": "frompid",
  "linkToPortIdProperty": "topid",
  "nodeDataArray": [
{"key":1, "type":"JSON", "name":"Policy"},
{"key":2, "type":"Filter", "name":"Commercial Accounts"},
{"key":3, "type":"Mongo", "name":"Policy Data"},
{"key":4, "type":"Join"},
{"key":5, "type":"Sort", "name":"Policy Date"},
{"key":6, "type":"Teradata"}
  ],
  "linkDataArray": [
{"from":1, "frompid":"OUT", "to":2, "topid":"L"},
{"from":2, "frompid":"OUT", "to":4, "topid":"L"},
{"from":3, "frompid":"OUT", "to":4, "topid":"R"},
{"from":4, "frompid":"OUT", "to":5, "topid":"L"},
{"from":5, "frompid":"OUT", "to":6, "topid":"L"}
]
}
```

-continued

Figure 8:
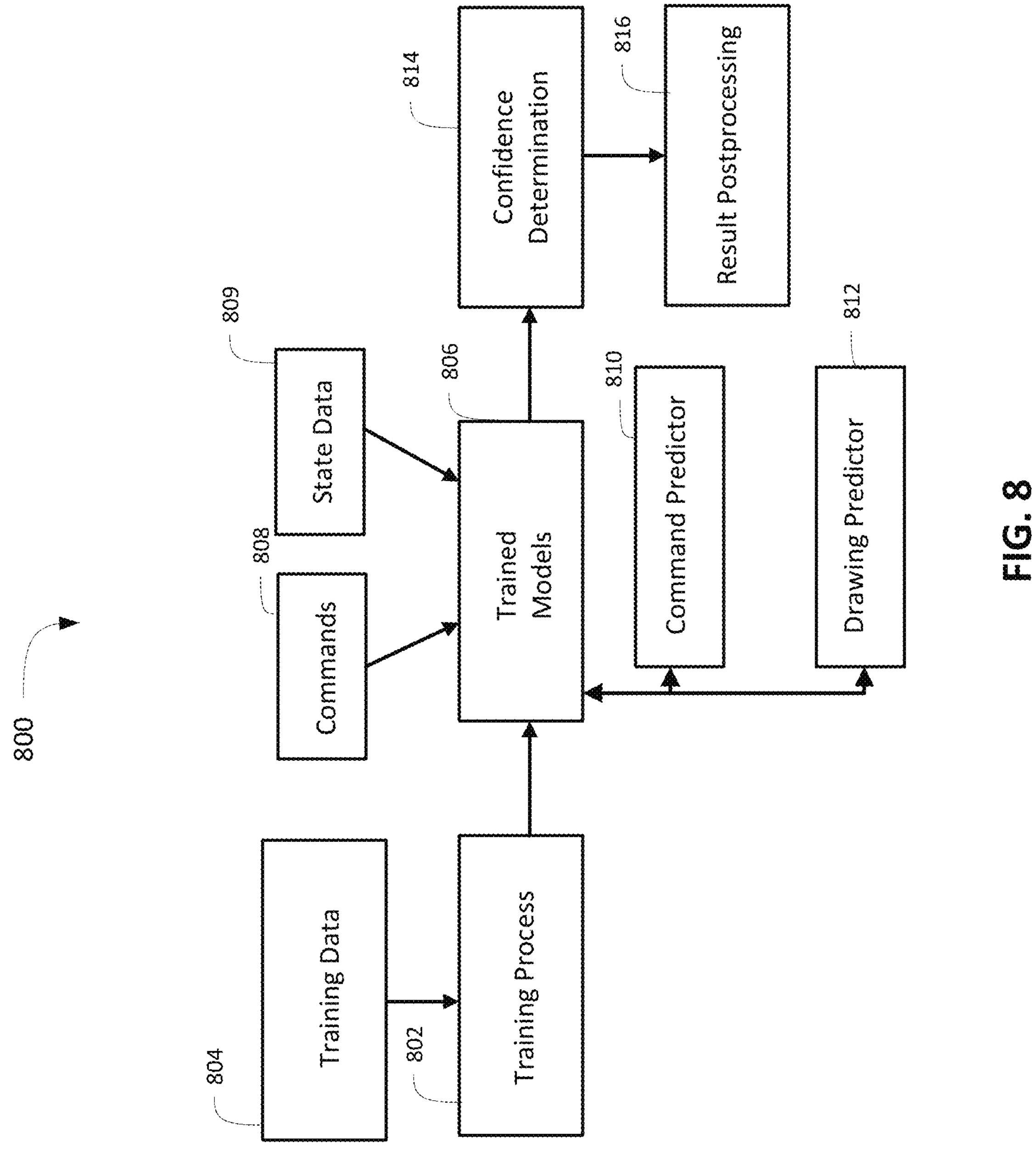
FIG. 8 depicts a training and prediction process according to some embodiments of the present invention.

FIG. 8 depicts a training and prediction process 800 according to some embodiments. The training and prediction process 800 can include a training process 802 that analyzes training data 804 to develop trained models 806 as examples of a command predictor 810 and drawing predictor 812. The training process 802 can use labeled or unlabeled data in the training data 804 to learn features, such as a mapping of words and phrases to commands and parameters. The training data 804 can include logs of previously executed commands, parameters, and event sequences captured for the system 100 of FIG. 1 or a similar system and other data to establish a ground truth for learning coefficients/weights and other such features known in the art of machine learning to develop trained models 806. The trained models 806 can include a family of models to identify specific types of features from commands 808 and/or state data 809. The commands 808 can be collected during interaction sequences with the whiteboard session manager 114 and/or collaborative drawing tool 112 of FIG. 1 and/or extracted from log files associated with operation of the session management server 110 of FIG. 1. The state data 809 can include data extracted from the project repository 116 of FIG. 1 to learn format patterns of projects, such as combinations of components of the component library 124 and corresponding code selected from the code library 134. The trained models 806 can include the command predictor 810 to support the natural language processing 408 of FIG. 4 through machine learning in determining how to interpret text patterns and collect missing/incomplete user input. The drawing predictor 812 can be used by block 412 of FIG. 4 to suggest positioning and labeling of components from the component library 124 when forming the message 414 to fill in for incomplete requests. The drawing predictor 812 can access rules associated with one or more templates used to create drawings and use the currently defined rules to establish a baseline from which further learning is expanded upon to supplement the rules. For instance, the rules may initially be incomplete and the drawing predictor 812 can learn to fill in gaps and expand upon the rules. Other such models and further subdivision of the trained models 806 can be incorporated in various embodiments.

The trained models 806 can output a confidence determination 814 indicating a confidence level of a command prediction or drawing prediction. For example, where there is a conversion error by the speech-to-text processing 406 of FIG. 4, the confidence determination may be below a threshold as not matching a known pattern. Depending on the confidence level with alternate interpretations, the command predictor 810 can predict a corrected command and avoid an error condition. Where the confidence level is below a threshold level, such that an alternate formulation that has a higher confidence level above a threshold is not known, the command predictor 810 can determine, for example, one or more proposed prompts for the user 306, such as, "Can you please repeat your last command request?" Result postprocessing 816 can determine an action to take based on the confidence level identified by the confidence determination 814, such as using a corrected command or initiating an interaction for further clarification. As results are processed and interpreted, the results or user responses to the results can be used as feedback to adjust the confidence determination 814. It will be understood that the training and prediction process 800 can be performed by any portion of the system 100 of FIG. 1 and/or may be performed by another server (not depicted) which may be accessible by the system 100.

Figure 9:
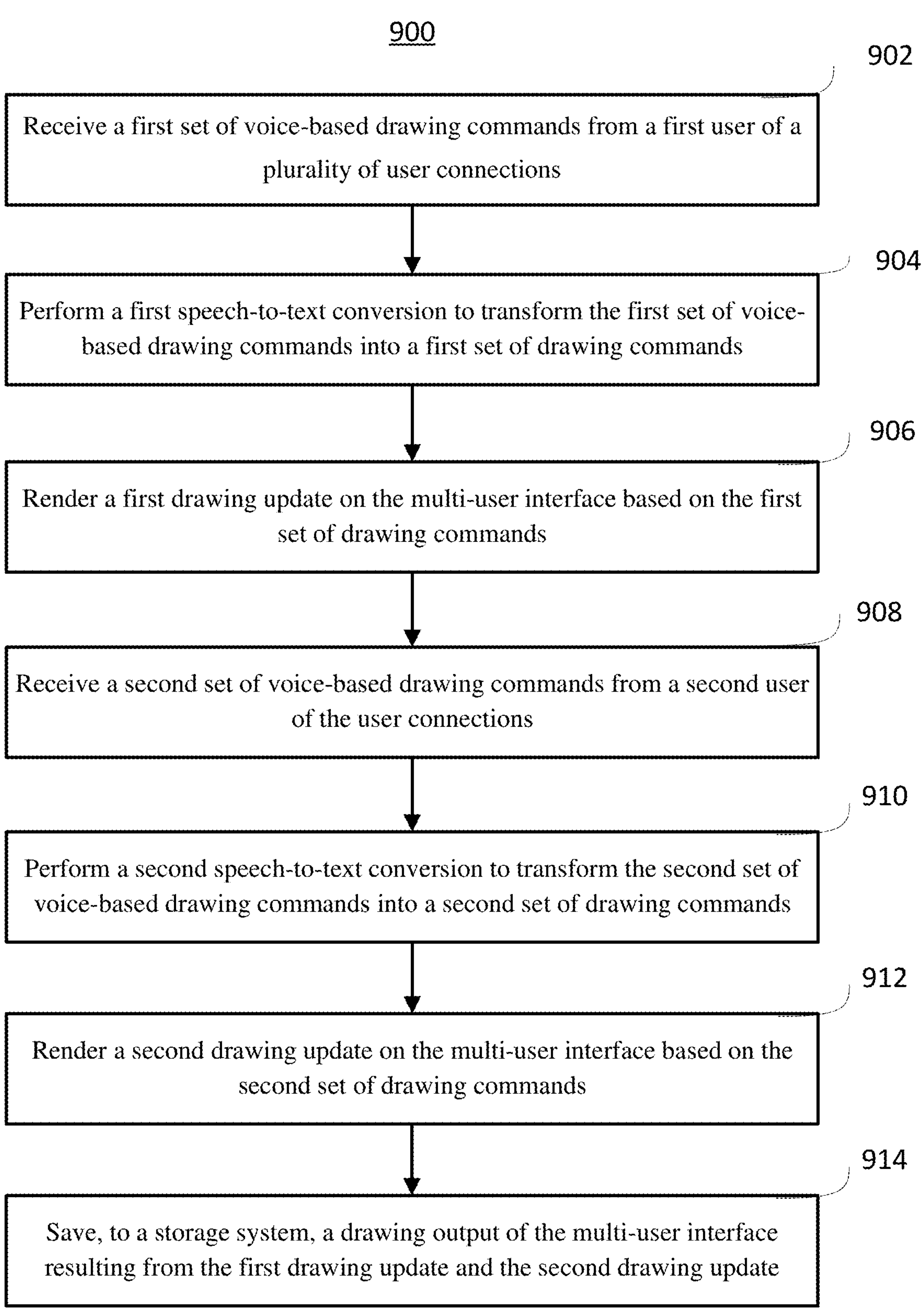
FIG. 9 depicts a process flow according to some embodiments of the present invention.

Turning now to FIG. 9, a process flow 900 is depicted according to an embodiment. The process flow 900 includes a number of steps that may be performed in the depicted sequence or in an alternate sequence. The process flow 900 may be performed by the system 100 of FIG. 1. In one embodiment, the process flow 900 is performed by the collaborative drawing tool 112 in combination with the whiteboard session manager 114 of FIG. 1. The process flow 900 is described in reference to FIGS. 1-9.

At step 902, a first set of voice-based drawing commands can be received from a first user 306 of user connections through communication channels 105. At step 904, a first speech-to-text conversion can be performed to transform the first set of voice-based drawing commands into a first set of drawing commands. Speech-to-text conversion can be performed using a combination of the speech-to-text processing 406 and the natural language processing 408, for instance using the speech processing service 140. At step 906, a first drawing update can be rendered on the multi-user interfaces 500A, 500B based on the first set of drawing commands. At step 908, a second set of voice-based drawing commands can be received from a second user 306 of the user connections through communication channels 105. The first set of voice-based drawing commands and the second set of voice-based drawing commands can be received through separate audio channels. At step 910, a second speech-to-text conversion can be performed to transform the second set of voice-based drawing commands into a second set of drawing commands. Speech-to-text conversion can be performed using a combination of the speech-to-text processing 406 and the natural language processing 408, for instance, using the speech processing service 140. At step 912, a second drawing update can be rendered on the multi-user interfaces 500A, 500B based on the second set of drawing commands. At step 914, a drawing output of the multi-user interfaces 500A, 500B can be saved to a storage system, such as the project repository 116, resulting from the first drawing update and the second drawing update.

The drawing commands of the process flow 900 can place predefined components into locations based on rules defined in one or more templates associated with a drawing type and based on the location of open space within the current drawing. For example, if the drawing type is a flowchart, an associated template may indicate whether the default flow is left-to-right or top-to-bottom. Where the flow is left-to-right, the placement rules can define that initial component placement is at a left-center position to provide a starting point to grow the drawing towards the right. Where the flow is top-to-bottom, the placement rules can define that initial component placement is at a top-center position to provide a starting point to grow the drawing in a downward direction. If the drawing type is a seating chart, the placement rules can define that initial component placement is at a center position to provide a starting point to grow the drawing outwardly from an anchor position. Other rules can be defined for various drawing types, such as dataflows, organizational charts, and the like. Further, drawing templates can have associated visual component palettes that define shapes, connectors, and attributes. Palettes of components can be expanded to incorporate new features and rules for placement and linking. For instance, where additional input ports or output ports are needed for an existing component, the associated palette of a drawing template can be expanded to create variations of existing components or entirely new components. Components can be defined through code or through an editor application. Component placement rules can include checking for compatible data types between inputs and outputs, identifying a closest available port of a component from a plurality of ports, avoiding overlapping of components and links, and other such factors. As drawings grow in size, auto rescaling or automated point-of-view shifting can be used to ensure that newly placed components are visible even if other components of a drawing are shifted out of view during new component placement.

In some embodiments, a change history of the first user 306 can be tracked based on a first sequence including one or more sets of drawing commands received on a first audio channel associated with the first user 306. A change history of the second user 306 can be tracked based on a second sequence including one or more sets of drawing commands received on a second audio channel associated with the second user 306. An undo feature can be provided to remove one or more drawing updates based on the change history.

In some embodiments, the collaborative drawing tool 112 and/or the whiteboard session manager 114 can perform resizing a field of view of a display on the multi-user interface 500A, 500B based on adding, moving, or deleting a visual component upon rendering a first drawing update and/or a second drawing update. One or more changes made through the multi-user interface 500A, 500B can be broadcast to all user devices (e.g., user systems 106) communicating with the multi-user interface 500A, 500B through the user connections, for instance, through the synchronization API 142. A session identifier can be assigned to a shared session through the multi-user interface 500A, 500B for the user connections, and access to the shared session can be controlled through a user authentication based on the session identifier. The first user 306 and the second user 306 can be identified based on a sign-in interface that requires user credential entry prior to accepting input from the first user 306 and the second user 306. The multi-user interface 500A, 500B can include a shared microphone selector that enables voice detection for one user and disables voice capture from other users of the user connections. The multi-user interface 500A, 500B can be configured to receive a combination of voice-based input and manual input through the user connections, where the manual input can include one or more of: typed text, a selection action, and a clicking action.

In some embodiments, a template associated with the first set of commands is identified, and one or more components to include in the rendering are determined based on the template and contents of the first set of commands. At least one of the one or more components can be customized based on a change request to make a modification.

In some embodiments, permission to make one or more updates to a drawing through the multi-user interface 500A, 500B can be limited based on determining an identity of the first user 306 and/or the second user 306 and one or more access constraints assigned to the first user 306 and/or the second user 306.

Figure 10:
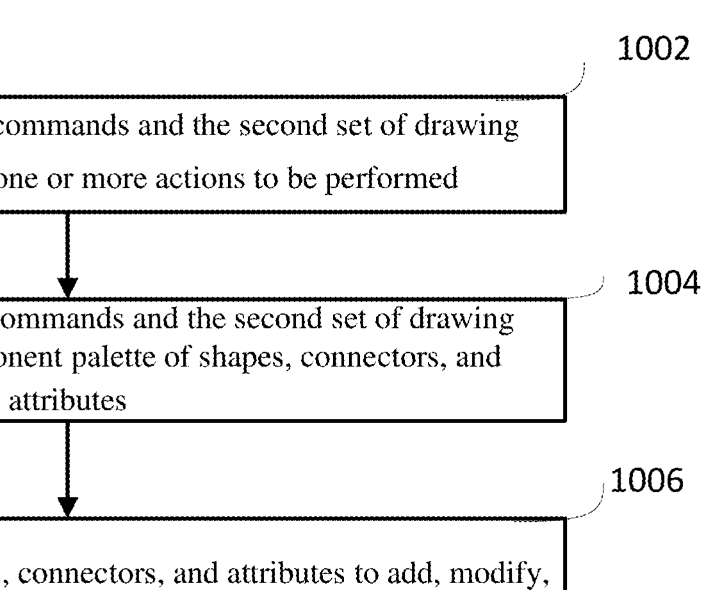
FIG. 10 depicts a process flow according to some embodiments of the present invention.

Turning now to FIG. 10, a process flow 1000 is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the collaborative drawing tool 112 in combination with the whiteboard session manager 114 of FIG. 1. The process flow 1000 can comprise an extension of process flow 900 of FIG. 9. The process flow 1000 is described in reference to FIGS. 1-10.

At step 1002, the first set of drawing commands and the second set of drawing commands are parsed to determine one or more actions to be performed. At step 1004, the first set of drawing commands and the second set of drawing commands are mapped to a visual component palette of shapes, connectors, and attributes of the component library 124. At step 1006, one or more of the shapes, connectors, and attributes are selected to add, modify, or delete based on the mapping. At step 1008, one or more of adding, modifying, or deleting are performed based on the one or more actions determined.

Figure 11:
FIG. 11 depicts a process flow according to some embodiments of the present invention.
Figure 11:
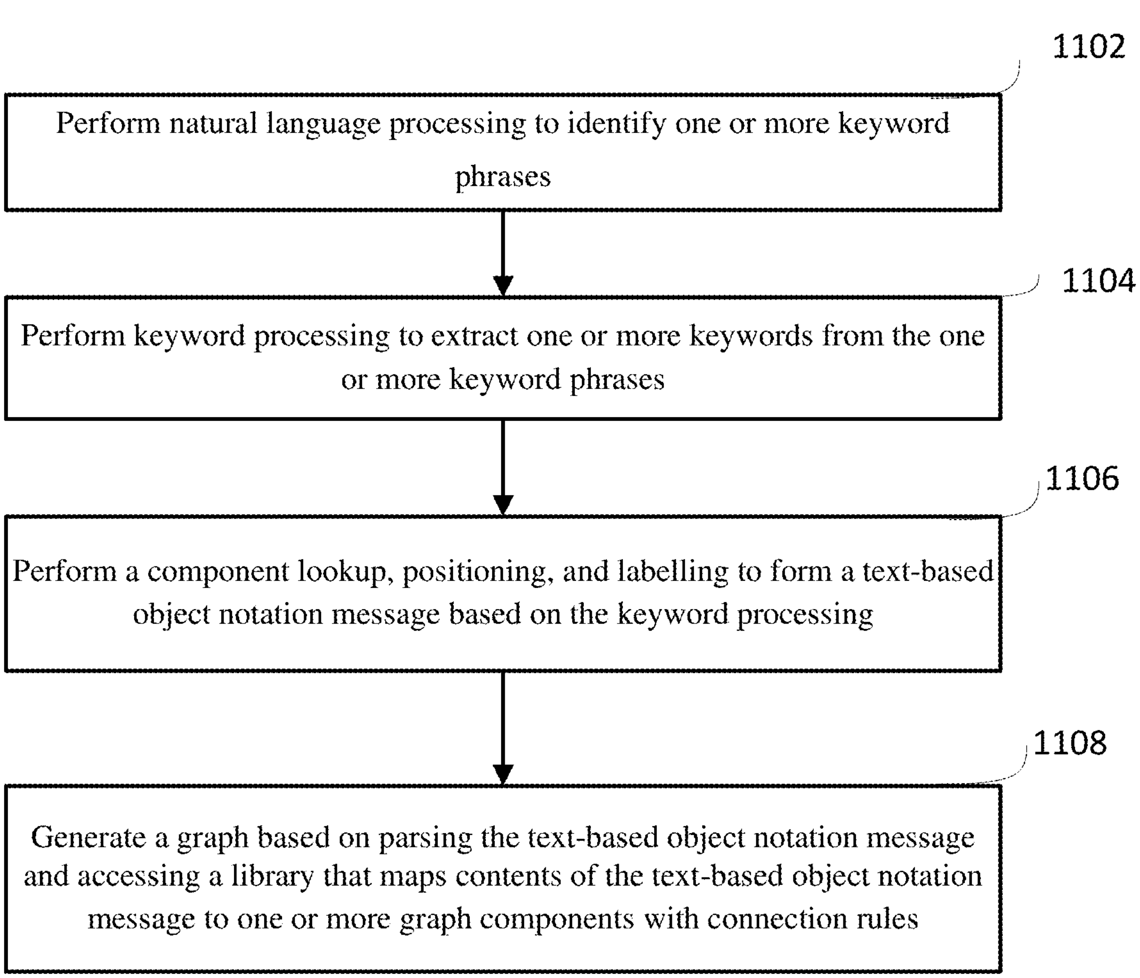

Turning now to FIG. 11, a process flow 1100 is depicted according to an embodiment. The process flow 1100 includes a number of steps that may be performed in the depicted sequence or in an alternate sequence. The process flow 1100 may be performed by the system 100 of FIG. 1. In one embodiment, the process flow 1100 is performed by the collaborative drawing tool 112 in combination with the whiteboard session manager 114 of FIG. 1. The process flow 1100 can comprise an extension of process flows 900, 1000 of FIGS. 9 and 10. The process flow 1100 is described in reference to FIGS. 1-11.

At step 1102, natural language processing 408 can be performed to identify one or more keyword phrases. At step 1104, keyword processing 410 can be performed to extract one or more keywords from the one or more keyword phrases. In some embodiments, a key phrase can be monitored (e.g., "Hey, Visualate") to determine which user of a plurality of users 306 is identified as the first user 306. At step 1106, a component lookup, positioning, and labelling can be performed as part of block 412 to form a text-based object notation message based on the keyword processing. At step 1108, a graph 418 can be generated based on parsing the text-based object notation message and accessing at least one library (e.g., component library 124) that maps contents of the text-based object notation message to one or more graph components with connection rules.

In summary with reference to FIGS. 1-11, the system 100 can access a drawing file defined in a text-based object notation file format and render a drawing on the multi-user interface 500A, 500B in a graphical display format based on parsing and interpreting contents of the drawing file in the text-based object notation file format. The drawing file can be updated in the text-based object notation file format based on the first drawing update and the second drawing update, where saving the drawing output stores the drawing file in the text-based object notation file format.

Technical effects include providing a collaborative voice-based design and development system to create or update drawings or graphs in a real-time voice-based communication session through a shared whiteboard. The voice-based drawing system can support hands-free operation and faster interactions than the use of manual controls to create and update drawings. Further, the multi-user interface is simplified as compared to other interfaces that include manual editing and creation tools. The collaborative voice-based design and development system can have cross platform support with multiple languages. Voice-based commands can eliminate the need for users to search and navigate for specific components to place them and adjust the placement as additional components are added to a graph. Using sharable and portable file formats for storage can reduce the complication associated with importing, exporting, printing and sharing the output of the system.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:

a multi-user interface configured to be shared by a plurality of user connections over a network interface and displayed by a plurality of user systems, each user system of the plurality of user systems comprising a processing system and a display; and a collaborative drawing tool executable by at least one processing device and comprising a plurality of instructions that when executed by the at least one processing device result in:

receiving a first set of voice-based drawing commands from a first user of the user connections;

performing a first speech-to-text conversion to transform the first set of voice-based drawing commands into a first set of drawing commands;

performing component lookup, positioning, and labelling to form a first message based on keyword processing;

mapping contents of the first message to one or more graph components with connection rules to render a drawing output at each user system of the plurality of user systems by accessing a code library that comprises code to display the one or more graph components corresponding to a device type of each user system of the plurality of user systems;

generating a graph configured to graphically depict the one or more graph components through the multi-user interface using by transmitting the code to each user system of the plurality of user systems, the code corresponding to the device type of each user system of the plurality of user systems;

controlling the multi-user interface to render a first drawing update of the graph on the multi-user interface based on the first set of drawing commands;

receiving a second set of voice-based drawing commands from a second user of the user connections;

performing a second speech-to-text conversion to transform the second set of voice-based drawing commands into a second set of drawing commands;

performing component lookup, positioning, and labelling to form a second message based on keyword processing;

updating the graph based on parsing the second message and accessing the code library that maps contents of the second message to the one or more graph components with connection rules to render the drawing output at each user system of the plurality of user systems;

controlling the multi-user interface to render a second drawing update of the graph on the multi-user interface based on the second set of drawing commands; and saving, to a storage system, the drawing output of the multi-user interface resulting from the first drawing update and the second drawing update.

2. The system of claim 1, wherein the first set of voice-based drawing commands and the second set of voice-based drawing commands are received through separate audio channels.

3. The system of claim 2, further comprising instructions that when executed by the at least one processing device result in:

tracking a change history of the first user based on a first sequence comprising one or more sets of drawing commands received on a first audio channel associated with the first user;

tracking a change history of the second user based on a second sequence comprising one or more sets of drawing commands received on a second audio channel associated with the second user; and providing an undo feature to remove one or more drawing updates based on the change history.

4. The system of claim 1, further comprising instructions that when executed by the at least one processing device result in:

mapping the first set of drawing commands and the second set of drawing commands to a visual component palette of shapes, connectors, and attributes; and selecting one or more of the shapes, connectors, and attributes to add, modify, or delete based on the mapping.

5. The system of claim 4, further comprising instructions that when executed by the at least one processing device result in:

parsing the first set of drawing commands and the second set of drawing commands to determine one or more actions to be performed; and performing one or more of adding, modifying, or deleting based on the one or more actions determined.

6. The system of claim 1, further comprising instructions that when executed by the at least one processing device result in:

resizing a field of view of a display on the multi-user interface based on adding, moving, or deleting a visual component upon rendering the first drawing update and/or the second drawing update.

7. The system of claim 1, further comprising instructions that when executed by the at least one processing device result in:

broadcasting one or more changes made through the multi-user interface to all the plurality of user systems.

8. The system of claim 7, further comprising instructions that when executed by the at least one processing device result in:

assigning a session identifier to a shared session through the multi-user interface for the user connections; and controlling access to the shared session through a user authentication based on the session identifier.

9. The system of claim 8, wherein the first user and the second user are identified based on a sign-in interface that requires user credential entry prior to accepting input from the first user and the second user.

10. The system of claim 1, wherein speech-to-text conversion comprises:

performing natural language processing to identify one or more keyword phrases; and performing keyword processing to extract one or more keywords from the one or more keyword phrases.

11. The system of claim 10, wherein the first message and the second message are each a text-based object notation message.

12. The system of claim 1, wherein the multi-user interface comprises a shared microphone selector that enables voice detection for one user and disables voice capture from other users of the user connections.

13. The system of claim 1, further comprising instructions that when executed by the at least one processing device result in:

identifying a template associated with the first set of commands; and determining one or more components to include in the rendering based on the template and contents of the first set of commands.

14. The system of claim 13, further comprising instructions that when executed by the at least one processing device result in:

customizing at least one of the one or more components based on a change request to make a modification.

15. The system of claim 1, further comprising instructions that when executed by the at least one processing device result in:

monitoring for a key phrase to determine which user of a plurality of users is identified as the first user.

16. The system of claim 1, further comprising instructions that when executed by the at least one processing device result in:

limiting permission to make one or more updates to a drawing through the multi-user interface based on determining an identity of the first user, the second user, and a third user and one or more access constraints assigned to the first user, the second user, and the third user, wherein limiting permission comprises preventing the third user from making an update to the drawing in a shared session with the first user and the second user based on determining that the third user lacks a drawing update permission.

17. The system of claim 1, further comprising instructions that when executed by the at least one processing device result in:

accessing a drawing file defined in a text-based object notation file format;

rendering a drawing on the multi-user interface in a graphical display format based on parsing and interpreting contents of the drawing file in the text-based object notation file format; and updating the drawing file in the text-based object notation file format based on the first drawing update and the second drawing update, wherein saving the drawing output stores the drawing file in the text-based object notation file format.

18. The system of claim 1, wherein the multi-user interface is configured to receive a combination of voice-based input and manual input through the user connections, the manual input comprising one or more of: typed text, a selection action, and a clicking action.

19. A computer program product comprising a non-transitory storage medium embodied with computer program instructions that when executed by a computer cause the computer to implement:

receiving a first set of voice-based drawing commands from a first user of a plurality of user connections;

performing a first speech-to-text conversion to transform the first set of voice-based drawing commands into a first set of drawing commands;

performing component lookup, positioning, and labelling to form a first message based on keyword processing;

mapping contents of the first message to one or more graph components with connection rules to render a drawing output at each user system of a plurality of user systems by accessing a code library that comprises code to display the one or more graph components corresponding to a device type of each user system of the plurality of user systems, wherein each user system of the plurality of user systems comprises a processing system and a display;

generating a graph configured to graphically depict the one or more graph components through the multi-user interface by transmitting the code to each user system of the plurality of user systems, the code corresponding to the device type of each user system of the plurality of user systems;

controlling a multi-user interface to render a first drawing update of the graph on the multi-user interface based on the first set of drawing commands;

receiving a second set of voice-based drawing commands from a second user of the user connections;

performing a second speech-to-text conversion to transform the second set of voice-based drawing commands into a second set of drawing commands;

performing component lookup, positioning, and labelling to form a second message based on keyword processing;

updating the graph based on parsing the second message and accessing the code library that maps contents of the second message to the one or more graph components with connection rules to render the drawing output at each user system of the plurality of user systems;

controlling the multi-user interface to render a second drawing update of the graph on the multi-user interface based on the second set of drawing commands; and saving, to a storage system, the drawing output of the multi-user interface resulting from the first drawing update and the second drawing update.

20. The computer program product of claim 19, further comprising computer program instructions that when executed by the computer cause the computer to implement:

tracking a change history of the first user based on a first sequence comprising one or more sets of drawing commands received on a first audio channel associated with the first user;

tracking a change history of the second user based on a second sequence comprising one or more sets of drawing commands received on a second audio channel associated with the second user; and providing an undo feature to remove one or more drawing updates based on the change history.

21. The computer program product of claim 19, further comprising computer program instructions that when executed by the computer cause the computer to implement:

parsing the first set of drawing commands and the second set of drawing commands to determine one or more actions to be performed;

mapping the first set of drawing commands and the second set of drawing commands to a visual component palette of shapes, connectors, and attributes;

selecting one or more of the shapes, connectors, and attributes to add, modify, or delete based on the mapping; and performing one or more of adding, modifying, or deleting based on the one or more actions determined.

22. The computer program product of claim 19, further comprising computer program instructions that when executed by the computer cause the computer to implement:

broadcasting one or more changes made through the multi-user interface to the plurality of user systems;

assigning a session identifier to a shared session through the multi-user interface for the user connections; and controlling access to the shared session through a user authentication based on the session identifier, wherein the first user and the second user are identified based on a sign-in interface that requires user credential entry prior to accepting input from the first user and the second user.

23. The computer program product of claim 19, further comprising computer program instructions that when executed by the computer cause the computer to implement:

performing natural language processing to identify one or more keyword phrases; and performing keyword processing to extract one or more keywords from the one or more keyword phrases.

24. The computer program product of claim 19, further comprising computer program instructions that when executed by the computer cause the computer to implement:

identifying a template associated with the first set of commands;

determining one or more components to include in the rendering based on the template and contents of the first set of commands; and customizing at least one of the one or more components based on a change request to make a modification.

25. The computer program product of claim 19, further comprising computer program instructions that when executed by the computer cause the computer to implement:

accessing a drawing file defined in a text-based object notation file format;

rendering a drawing on the multi-user interface in a graphical display format based on parsing and interpreting contents of the drawing file in the text-based object notation file format; and updating the drawing file in the text-based object notation file format based on the first drawing update and the second drawing update, wherein saving the drawing output stores the drawing file in the text-based object notation file format.

* * * * *